United States Patent
Nguyen et al.

(10) Patent No.: US 12,420,916 B2
(45) Date of Patent: Sep. 23, 2025

(54) AIRCRAFT LANDING GEAR PROVIDED WITH A SHAPE SENSOR

(71) Applicant: SAFRAN LANDING SYSTEMS, Velizy-Villacoublay (FR)

(72) Inventors: Nicolas Nguyen, Moissy-Cramayel (FR); Bertrand Dubacher, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 28 days.

(21) Appl. No.: 18/570,500

(22) PCT Filed: Jun. 17, 2022

(86) PCT No.: PCT/EP2022/066616
§ 371 (c)(1),
(2) Date: Dec. 14, 2023

(87) PCT Pub. No.: WO2022/263660
PCT Pub. Date: Dec. 22, 2022

(65) Prior Publication Data
US 2024/0278907 A1    Aug. 22, 2024

(30) Foreign Application Priority Data
Jun. 18, 2021 (FR) ...................................... 2106524

(51) Int. Cl.
*B64C 25/00* (2006.01)
*B64C 25/10* (2006.01)
*G01B 11/26* (2006.01)

(52) U.S. Cl.
CPC ............ *B64C 25/001* (2013.01); *B64C 25/10* (2013.01); *G01B 11/26* (2013.01)

(58) Field of Classification Search
CPC ........ B64C 25/001; B64C 25/10; G01B 11/26
See application file for complete search history.

(56) References Cited

U.S. PATENT DOCUMENTS

| 7,274,310 | B1 | 9/2007 | Nance |
| 10,732,023 | B2 | 8/2020 | Mastrianni et al. |

(Continued)

FOREIGN PATENT DOCUMENTS

FR    2 787 761 A1    6/2000

OTHER PUBLICATIONS

International Search Report for PCT/EP2022/066616 dated Sep. 20, 2022.

(Continued)

*Primary Examiner* — Rodney A Bonnette
(74) *Attorney, Agent, or Firm* — Sughrue Mion, PLLC

(57) ABSTRACT

An aircraft landing gear includes a stationary element and one or more movable elements which can move relative to the stationary element between a first position and a second position, and one or more shape sensors, connected to an electronic processor arranged to deduce the position of the movable element of the shape of the shape sensor. The shape sensor includes a first section rigidly connected to the stationary element and a second section rigidly connected to the movable element so that the first section and the second section are immobile with respect to the stationary element and the movable element respectively, and are movable relative to one another.

11 Claims, 2 Drawing Sheets

(56) References Cited

U.S. PATENT DOCUMENTS

| | | | | |
|---|---|---|---|---|
| 2010/0017052 | A1* | 1/2010 | Luce | B64C 25/60 |
| | | | | 356/73.1 |
| 2011/0154907 | A1* | 6/2011 | Schmidt | G01M 11/08 |
| | | | | 73/800 |
| 2014/0252210 | A1 | 9/2014 | Schmidt | |
| 2018/0222575 | A1* | 8/2018 | Cepic | B64D 45/00 |
| 2020/0369381 | A1* | 11/2020 | Jackson | B64C 25/40 |
| 2021/0024200 | A1 | 1/2021 | Rogers | |
| 2023/0322404 | A1* | 10/2023 | Zhang | G01G 19/07 |
| | | | | 701/3 |

OTHER PUBLICATIONS

Written Opinion for PCT/EP2022/066616 dated Sep. 20, 2022.
A. Ieie, et al., "Load monitoring of aircraft landing gears using fiber optic sensors", Sensors and Actuators A: Physical, Aug. 17, 2018, pp. 31-41, vol. 281.

* cited by examiner

AIRCRAFT LANDING GEAR PROVIDED WITH A SHAPE SENSOR

CROSS REFERENCE TO RELATED APPLICATIONS

This application is a National Stage of International Application No. PCT/EP2022/066616 filed Jun. 17, 2022, claiming priority based on French Patent Application No. FR2106524 filed Jun. 18, 2021, the contents of each of which being herein incorporated by reference in their entireties.

The present invention relates to the field of landing gears and more specifically, means making it possible to detect positions of a landing gear.

BACKGROUND OF THE INVENTION

Aircraft landing gears are known, comprising a strut movably mounted on the structure of an aircraft between a deployed position (for takeoff and landing), and a retracted position (for the flight) under the action of an operating actuator.

Some of these landing gears, and in particular auxiliary landing gears comprise a low part, which is translatably and rotatably movable, in order in particular to enable the damping and the direction of the aircraft on the ground. To this end, the strut is generally constituted of a box wherein a rod is slidingly mounted, carrying the wheels of the landing gear, and a rotating sleeve, surrounding a lower part of the box or a rotating tube inserted between the box and the sliding rod. The sleeve (or the rotating tube) is connected to the rod by an articulated compass. Actuators make it possible to pivot the sleeve (or the rotating tube) and therefore the wheels, in response to an orientation order generated for example by means of a control wheel in the cockpit.

For safety reasons, such landing gears must go back to the systems of the aircraft for information about the state of the landing gear, in order to, for example, enable the retraction or the change of orientation of the strut according to the different operating modes of the aircraft (taxiing, takeoff, landing, flight, etc.).

To relay such information, it is known to use contactors or contactless position sensors.

The upper branch of the compass is, for example, equipped with a magnetic target arranged to be facing a Hall effect sensor fixed onto the box when the rod is in a relaxed extreme position. In operation, the presence of the magnetic target in front of the Hall effect sensor makes it possible to generate a signal conveying the fact that the wheels are not in contact with the ground and therefore, that the aircraft is in flight.

It is also common to equip the strut with a potentiometer of an RVDT (Rotary Variable Differential Transformer)-type sensor, to reproduce an angular position of the sleeve, and therefore of the rod carrying the wheels, via a gear reduction system.

However, such a reproducing system does not make it possible to capture the exact angular position of the rod, the position measured by the system cumulating the inaccuracies linked to the mechanical operating clearances of the strut (rod, compass, sleeve, gears) and to the electrical measuring errors of the sensor.

Moreover, the integration of contactors or contactless position sensors tends to increase the mass of the landing gear and requires the routing of often armoured cables with bend radii which are limiting to integrate.

What is more, the adjustment of such sensors can prove to be difficult, in particular during their installation or their replacement.

AIM OF THE INVENTION

The invention therefore aims to propose an aircraft landing gear making it possible to at least partially prevent the abovementioned disadvantages.

SUMMARY OF THE INVENTION

To this end, an aircraft landing gear is proposed, comprising a stationary element and at least one movable element, which can move relative to the stationary element between a first position and a second position, and detection means arranged to detect when the movable element is in at least one of its positions.

According to the invention, the detection means comprise at least one threadlike and flexible shape sensor, connected to an electronic processing unit arranged to deduce the position of the movable element of the shape of the shape sensor. The shape sensor comprises a first section rigidly connected to the stationary element and a second section rigidly connected to the movable element so that the first section and the second section are immobile with respect to the stationary element and to the movable element respectively, and are movable relative to one another.

Thus, the movement of the movable element between the first and the second position leads to a deformation of the sensor (except for at least the first and second sections) representative of a position of the movable element with respect to the stationary element, and therefore a state of the landing gear. The electronic processing unit makes it possible to determine the shape of the shape sensor and to deduce from this, the state of the landing gear. Learning during the installation or the replacement of the sensor can be necessary, but it is "software" and is not dependent on complex mechanical adjustments.

Moreover, such a sensor can provide several pieces of information about the state of the landing gear, and therefore replace several sensors, which makes it possible to limit the mass of said landing gear and simplifies its integration.

According to a particular embodiment of the invention, the shape sensor is an optical fibre shape sensor. This type of sensor is particularly light and easy to install.

Particularly, the shape sensor comprises a Bragg grated optical fibre.

Particularly, the shape sensor comprises a WDM-type wavelength multiplexing optical fibre.

Particularly, the shape sensor comprises an OFDR-type frequency domain reflectometry optical fibre.

According to a particular embodiment of the invention, the landing gear comprises a strut constituted of a box wherein a rod is slidingly mounted along an axis Z, a lower end of which carries wheels, and a sleeve rotating about the axis Z and surrounding a lower part of the box. The sleeve is connected by a compass articulated to the sliding rod. The first section and the second section of the shape sensor are respectively rigidly connected to the box and to the rod.

According to another particular embodiment of the invention, the landing gear comprises a strut constituted of a box, wherein a rod is slidingly mounted along an axis Z, a lower end of which carries wheels, and a rotating sleeve surrounding a lower part of the box and connected by a compass articulated to the sliding rod. The first section and the second section of the deformation sensor are respectively rigidly connected to the box and to the compass.

The invention also relates to a method for measuring at an instant t, a stroke of the rod of the landing gear of such a landing gear, wherein the electronic processing unit carries out the following steps:

when said rod is in a relaxed extreme position, determining and recording, from a light signal introduced in the shape sensor, a reference position about the axis Z of a measuring point of the second section of the shape sensor;

at the instant t, determining the measuring position from the light signal introduced in the shape sensor;

calculating the difference between the reference position and the position at the instant t; and deducing from this difference, the stroke of the rod at the instant t.

The invention also relates to a method for measuring at an instant t, a stroke of the rod of such a landing gear, wherein the compass comprises an upper branch articulated on the sleeve and a lower branch articulated on the upper branch and on the rod, the upper branch and the lower branch defining an opening angle of the compass. The electronic processing unit carries out the following steps:

when said rod is in a relaxed extreme position, determining and recording from a light signal introduced in the shape sensor, a reference opening angle of the compass;

at the instant t, determining the opening angle of the compass from the light signal introduced in the shape sensor;

calculating the difference between the reference opening angle and the opening angle at the instant t; and deducing from this difference, the stroke at the instant t of the rod by trigonometry.

The invention further relates to a method for measuring at an instant t, an angular position of the rod of such a landing gear, wherein the electronic processing unit carries out the following steps:

when the wheels are oriented about a longitudinal axis of the aircraft, determining and recording from a light signal introduced in the shape sensor, a reference position of a measuring point of the second section of the shape sensor;

at the instant t, determining the position of the measuring point from the light signal introduced in the shape sensor;

calculating the angle formed by the reference position and the position at the instant t with respect to the sliding and rotating axis Z of the rod; and deducing from this angle, the angular position of the rod at the instant t.

The invention in addition relates to a method for measuring at an instant t, an angular position of the rod of such a landing gear, wherein the electronic processing unit carries out the following steps:

when the wheels are oriented about a longitudinal axis of the aircraft, determining and recording from a light signal introduced in the shape sensor of the reference positions of at least two measuring points of the second section of the shape sensor arranged in a plane XY orthogonal to the sliding and rotating axis Z of the rod;

at the instant t, determining positions of the measuring points from the light signal introduced in the shape sensor; and calculating the angle formed by the straight line defined by the reference positions and the straight line defined by the positions at the instant t; and deducing from this angle, the angular position of the rod at the instant t.

BRIEF DESCRIPTION OF THE DRAWINGS

The invention will be best understood in the light of the description below, which is purely illustrative and non-limiting, and must be read regarding the accompanying figures, among which.

DETAILED DESCRIPTION OF THE INVENTION

Figure 1:
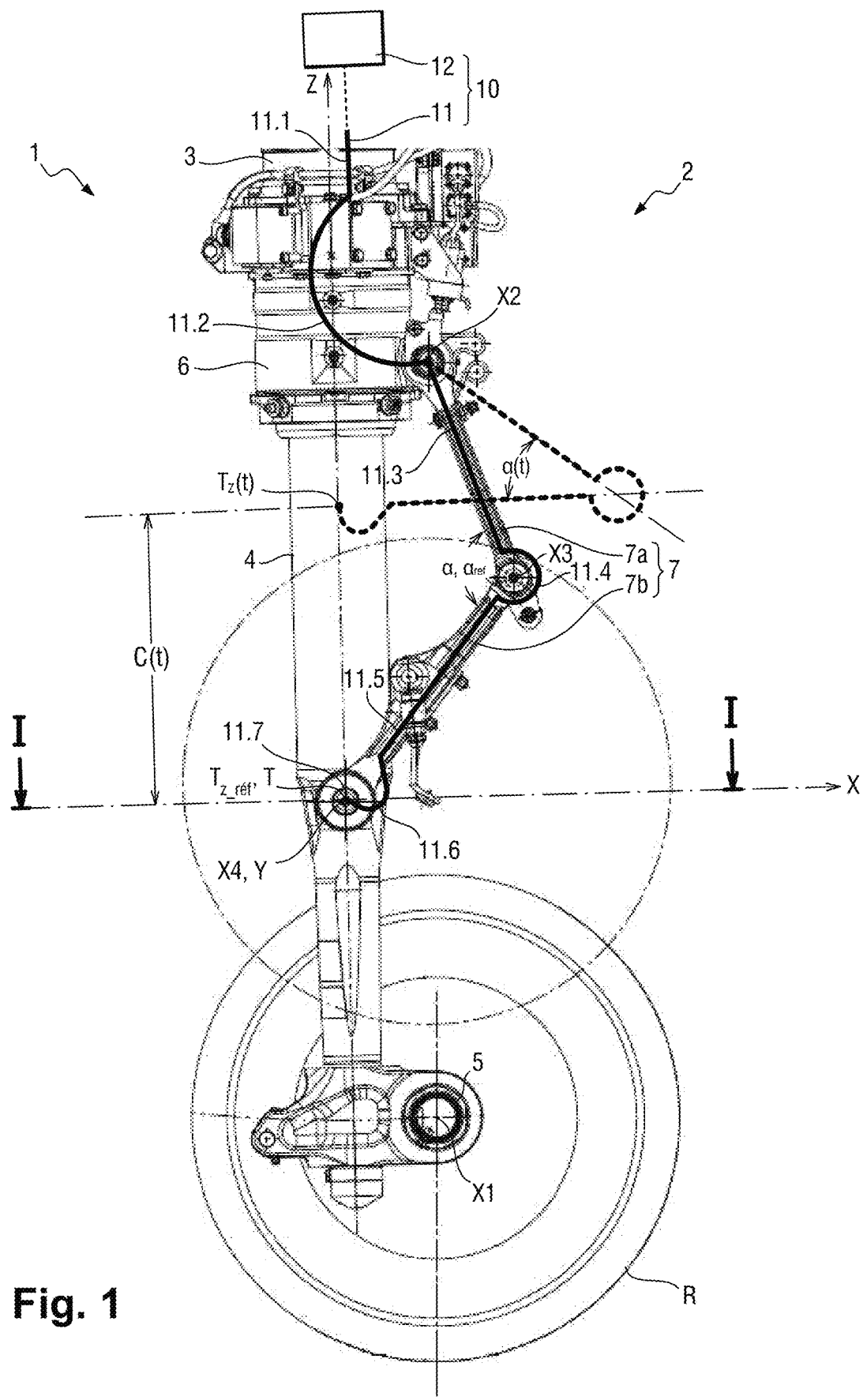
FIG. 1 is a view of a landing gear according to a particular embodiment of the invention.

In reference to FIG. 1, an aircraft landing gear 1 comprises, in a manner known per se, a strut 2 carrying wheels R in the lower part. The strut 2 comprises a box 3 mounted articulated on a structure of the aircraft. In the box 3, a rod 4 slides, along a longitudinal axis Z of the rod 4, between a so-called relaxed first extreme position (illustrated in this case) and a so-called compressed second extreme position. A lower end of the rod 4 carries an axle 5 receiving wheels R movably rotatably mounted about an axis X1 substantially horizontal in service.

A sleeve 6 is rotatably mounted about an axis Z on a lower part of the box 3 to be controllably oriented by an orientation member, known in itself, such as "push-pull"—mounted jacks, a rack arrangement or a rotary actuator. The sleeve 6 and the rod 4 are rotatably linked by a compass 7, so that the orientation of the sleeve 6 leads to the orientation of the rod 4 and therefore of the wheels R. The compass 7 comprises an upper branch 7a articulated on the sleeve 6 about an articulation axis X2, and a lower branch 7b articulated on the upper branch 7a and the rod 4 about the respective articulation axes X3 and X4. The articulation axes X2, X3, X4 of the compass are substantially parallel to the rotation axis X1 of the wheels R.

All of this is well-known, and is only reminded of for information for locating the context of the invention.

According to the invention, a side of the landing gear 1 is equipped with a threadlike and flexible shape sensor 10, comprising an optical fibre 11 rigidly connected both to the box 3, to the upper and lower branches 7a, 7b of the compass 7 and to the rod 4 as this will be explained below.

The optical fibre 11 comprises a first section 11.1 fixed onto an external surface of the box 3 to extend along the sliding axis Z of the rod 4, a third section 11.3 fixed onto an external surface of the upper branch 7a of the compass 7 to extend along a longitudinal axis of said upper branch 7a, a fifth section 11.5 fixed onto an external surface of the lower branch 7b of the compass 7 to extend along a longitudinal axis of said lower branch 7b, and a seventh section 11.7 fixed onto the rod 4 to extend along the articulation axis X4. The first, third, fifth and seventh sections 11.1, 11.3, 11.5, 11.7 are substantially rectilinear and are immobile respectively with respect to the box 3, to the upper branch 7a, to the lower branch 7b and to the rod 4.

The optical fibre 11 also comprises a second section 11.2 connecting the first section 11.1 and the third section 11.3, a fourth section 11.4 connecting the third section 11.3 and the fifth section 11.5, and a sixth section 11.6 connecting the fifth section 11.5 and the seventh section 11.7. The second, fourth and sixth sections 11.2, 11.4, 11.6 are free of any attachment apart from at their ends, and thus form slack loops, the path of which is mainly given by the stiffness of the optical fibre 11 and the relative positions of the first, third, fifth and seventh sections 11.1, 11.3, 11.5, 11.7 with respect to one another. As needed, the path of the slack loops can also be defined by mechanical guide elements fixed onto the landing gear.

A free end of the first section 11.1 is connected to an electronic processing unit 12, also called requester, which is adapted to the technology of the optical fibre 11 of the shape sensor 10.

In a manner known per se, the requester 12 introduces a light signal at a free end of the first section 11.1. The light signal propagates through the optical fibre 11 up to a free end of the seventh section 11.7 and is partially reflected by the core of the optical fibre 11 at different measuring points distributed over all of the sections 11.1-11.7. Any deformation of the optical fibre 11 generates a variation of the spectrum of the part of the reflected signal at each measuring point. This variation is analysed by the requester 12 to deduce from this, shape modifications applied to the optical fibre 11 between the different measuring points by determining, in particular, the coordinates of said measuring points.

A method for determining at an instant t, a stroke C of the rod 4 via the shape sensor 10 will now be detailed.

While the rod is in the relaxed extreme position (illustrated in FIG. 1), the requester 12 determines and records, via a light signal introduced in the optical fibre 11, a reference position $T_{z\_ref}$ about the axis Z of a measuring point T of the seventh section 11.7. This step can, for example, be carried out in the factory when the landing gear 1 is in a relaxed state, wherein the wheels R do not touch the ground.

Upon landing, the contact of the wheels R with the ground leads to the sliding of the rod 4 to the inside of the box 1, which simultaneously generates a translation of the seventh section 11.7 about the axis Z and a rotation of the upper and lower branches 7a, 7b of the compass 7 about the articulation axes X2, X3, X4, and therefore a deformation of the second, fourth and sixth sections 11.2, 11.4, 11.6.

The requester 12 determines, at each instant t, a position $T_z(t)$ about the axis Z of the measuring point T, then deduces from this, the stroke C of the rod by comparing the reference position $T_{z\_ref}$ and the position $T_z(t)$ according to the following formula: $C(t)=T_{z\_ref}-T_z(t)$.

When the stroke C exceeds a predetermined threshold (in this case, around a few millimetres), it is considered that the wheels R are in contact with the ground.

The application of this method at several measuring points T of the seventh section 11.7 makes it possible to improve accuracy, but also the robustness with which the stroke C of the rod 4 is determined.

It is also possible to connect, by trigonometry, the stroke C of the rod 4 at the opening angle α of the compass 7 defined by the longitudinal axes of the upper and lower branches 7a, 7b. Another method therefore consists of comparing the opening angle dref of the compass 7 when the rod 4 is in the relaxed extreme position with that α(t) at the instant t. These opening angles $α_{ref}$, α(t) can be deduced from positions determined by the requester 12 of at least two measuring points on each of the third and fifth sections 11.3, 11.5.

The simultaneous use of these two methods makes it possible to obtain a redundancy of the stroke C without adding additional sensors.

The addition of a second shape sensor 10 similarly equipping the other side of the landing gear also makes it possible to significantly improve the robustness of the stroke C determined by the implementation of at least one of the two methods.

Figure 2:
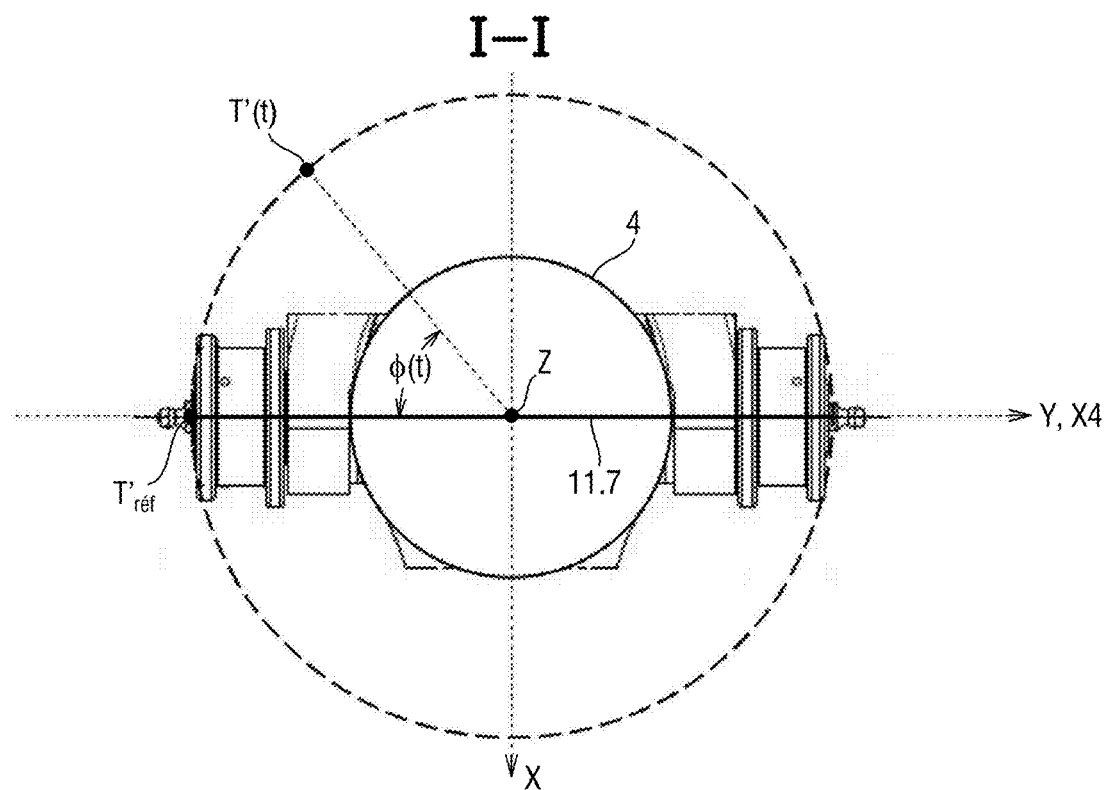
FIG. 2 is a schematic view of a method for determining at an instant t, an angular position of the rod of the landing gear illustrated in FIG. 1.
Figure 3:
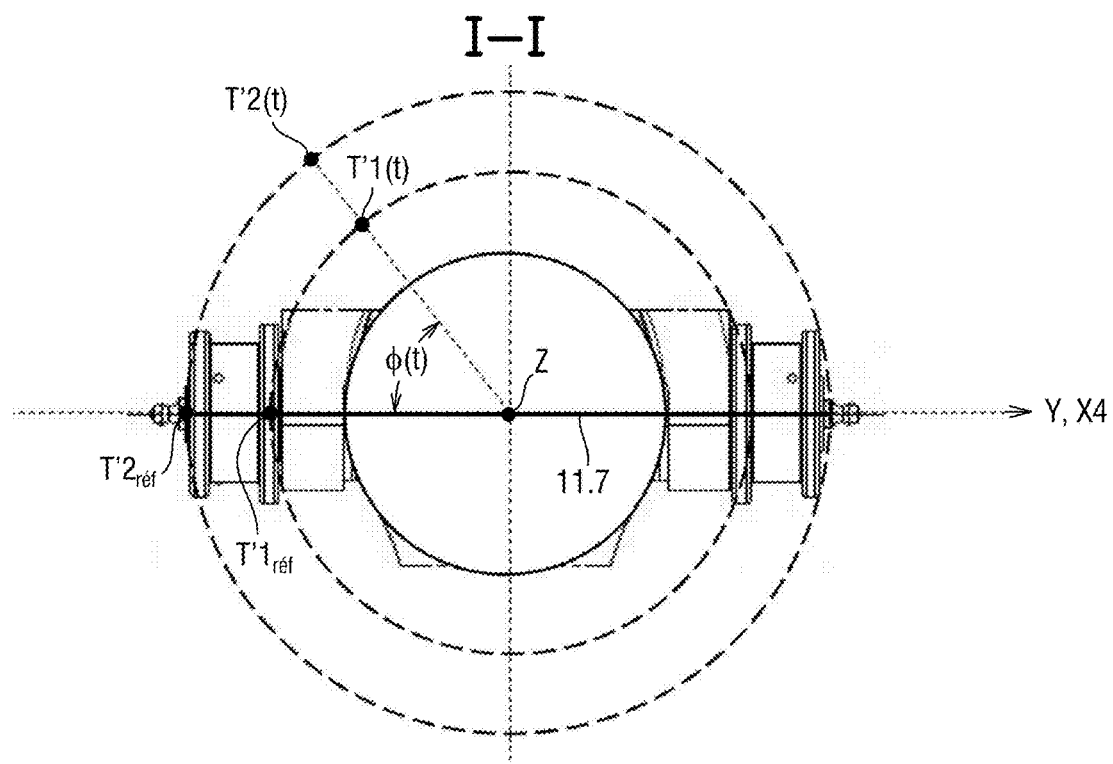
FIG. 3 is a schematic view of a variant of the method illustrated in FIG. 2.

In reference to FIG. 2, a method for determining at an instant t, an angular position Ø of the rod 4, and therefore an orientation of the wheels R, via the shape sensor 10 will now be detailed.

While the wheels R are oriented about a longitudinal axis of the aircraft, the requester 12 determines and records, via a light signal introduced in the optical fibre 11, a reference position $T'_{ref}$ of a measuring point T' of the seventh section 11.7. This step can, for example, be carried out in the factory, once the landing gear 1 is mounted on the structure of the aircraft.

When the aircraft moves on the ground, the orientation jacks are led to control a rotation of the sleeve 6, which generates a rotation of the third, fifth and seventh sections 11.3, 11.5, 11.7 about the axis Z, and therefore a deformation of the second section 11.2.

The requester 12 determines, at each instant t, a position T'(t) of the measuring point T' to deduce from this, the angular position Ø of the rod 4 defined by the angle Ø(t) formed by the positions $T'_{ref}$, T' of the measuring points T with respect to the axis Z.

The application of this method to several measuring points T' of the seventh section 11.7 makes it possible to improve accuracy, but also the robustness with which the angular position Ø of the rod 4 is determined.

Another method consists of determining and recording, via the requester 12, when the wheels R are oriented about the longitudinal axis of the aircraft, the positions $T1'_{ref}$, $T2'_{ref}$ of at least two measuring points T1', T2' of the seventh section 11.7. The requester 12 then determines at the instant t the positions T1' (t), T2' (t) of the measuring points T1', T2' to deduce from this, the angular position Ø of the rod 4 defined by the angle Ø(t) formed by the straight lines ($T1'_{ref}$, $T2'_{ref}$) and (T1'(t), T2'(t)).

It will be noted that one single shape sensor 10 in this case makes it possible to obtain several distinct pieces of information on the state of the landing gear 1, namely the orientation of the wheels R and their contact with the ground.

The application of this method to several pairs of measuring points T1', T2' of the seventh section 11.7 makes it possible to improve accuracy, but also the robustness with which the angular position Ø of the rod 4 is determined.

Naturally, the invention is not limited to the embodiment described, but includes any variant entering into the field of the invention such as defined by the claims.

Several optical fibre technologies can be used: Bragg grating (Fibre Bragg Grating), wavelength multiplexing of the WDM (Wavelength Division Multiplexing) type, frequency reflectometry of the OFDR (Optical Frequency Domain Reflectometry) type, etc.

Although the shape sensor, in this case, is an optical fibre-based sensor, the principle applies to any shape sensor.

In the case where the strut 2 is movably mounted on the structure of the aircraft between a deployed position (for takeoff and landing) and a retracted position (for the flight), the strut 2 is generally held in the deployed position by a breaker strut which is coupled to the strut 2 and to the structure of the aircraft, and which comprises two connecting rods articulated to one another. The connecting rods are held in an aligned position by a stabilisation member comprising two tie-rods articulated to one another. It is possible to equip the connecting rods and/or the tie-rods with a shape sensor 10 such as that described in this case, to determine the position of the strut and/or to ensure the correct locking of the stabilisation member.

Although the seventh section 11.7 is, in this case, colinear with the articulation axis X4 of the compass 7 on the rod 4, it can also extend into a plane XY substantially orthogonal to the axis Z. Thus, preferably, the measuring points T1', T2' will form a straight line cutting the axis Z.

The invention claimed is:

1. An aircraft landing gear comprising:
    a stationary element and at least one movable element which can move relative to the stationary element between a first position and a second position, and detection means arranged to detect when the movable element is in at least one of its positions,
    wherein the detection means comprise at least one thread-like and flexible shape sensor, connected to an electronic processing unit arranged to deduce the position of the movable element of the shape of the shape sensor, and
    the shape sensor comprising a first section rigidly connected to the stationary element and a second section rigidly connected to the movable element so that the first section and the second section are immobile with respect to the stationary element and the movable element respectively, and are movable relative to one another.

2. The aircraft landing gear according to claim 1, wherein the shape sensor is an optical fibre shape sensor.

3. The aircraft landing gear according to claim 2, wherein the shape sensor comprises a Bragg grated optical fibre.

4. A method for measuring, at a time t, a stroke of the rod of the aircraft landing gear according to claim 2, wherein the electronic processing unit is configured to:
    when said rod is in a relaxed extreme position, determine and record from a light signal introduced in the shape sensor a reference position about the axis of a measuring point of the second section of the shape sensor;
    at the time, determine a position of the measuring point from the light signal introduced in the shape sensor;
    calculate a difference between the reference position and the position at the time; and
    deduce from the difference, a stroke function C(t) of the rod at the time t.

5. The aircraft landing gear according to claim 1, wherein the shape sensor comprises a WDM-type wavelength division multiplexing optical fibre.

6. The aircraft landing gear according to claim 1, wherein the shape sensor comprises an OFDR-type frequency domain reflectometry optical fibre.

7. The aircraft landing gear according to claim 1, further comprising a strut comprising a box,
    wherein a rod is slidingly mounted about an axis, a lower end of which carries wheels, and a rotating sleeve surrounding a lower part of the box and connected by a compass articulated to the sliding rod, the first section and the second section of the shape sensor being respectively rigidly connected to the box and to the rod.

8. A method for measuring, at a time t, an angular position of the rod of the landing gear according to claim 7, wherein the electronic processing unit is configured to:
    when the wheels are oriented about a longitudinal axis of the aircraft, determine and record from a light signal introduced in the shape sensor a reference position of a measuring point of the second section of the shape sensor;
    at the time t, determine the position of the measuring point from the light signal introduced in the shape sensor;
    calculate the angle formed by the reference position and the position at the time t with respect to the sliding axis of the rod; and
    deduce from the angle the angular position of the rod at the time t.

9. A method for measuring, at a time t, an angular position of the rod of the aircraft landing gear according to claim 7, wherein the electronic processing unit is configured to:
    when the wheels are oriented about a longitudinal axis of the aircraft, determine and record from a light signal introduced in the shape sensor reference positions of at least two measuring points of the second section of the shape sensor arranged in a plane orthogonal to the sliding axis of the rod;
    at the time t, determining positions of the measuring points from the light signal introduced in the shape sensor; and
    calculating the angle formed by the straight line defined by the reference positions and the straight line defined by the positions at the time t; and
    deduce from the angle, the angular position of the rod at the time t.

10. The aircraft landing gear according to claim 1, further comprising a strut comprising a box,
    wherein the shape sensor comprises an optical fibre, and
    wherein a rod is slidingly mounted about an axis, a lower end of which carries wheels, and a rotating sleeve surrounding a lower part of the box and connected by a compass articulated to the sliding rod, the first section and the second section of the optical fibre being respectively rigidly connected to the box and to the compass.

11. A method for measuring, at a time t, a stroke of the rod of the aircraft landing gear according to claim 10, wherein the compass comprises an upper branch articulated on the sleeve and a lower branch articulated on the upper branch and on the rod, the upper branch and the lower branch defining an opening angle of the compass and the electronic processing unit being configured to:
    when said rod is in a relaxed extreme position, determine and record from a light signal introduced in the shape sensor a reference opening angle of the compass;
    at the time, determining the opening angle of the compass from the light signal introduced in the shape sensor;
    calculate a difference between the reference opening angle and the opening angle at the time; and
    deduce from the difference a stroke function C(t) at the time t of the rod by trigonometry.

* * * * *